Figure 1:
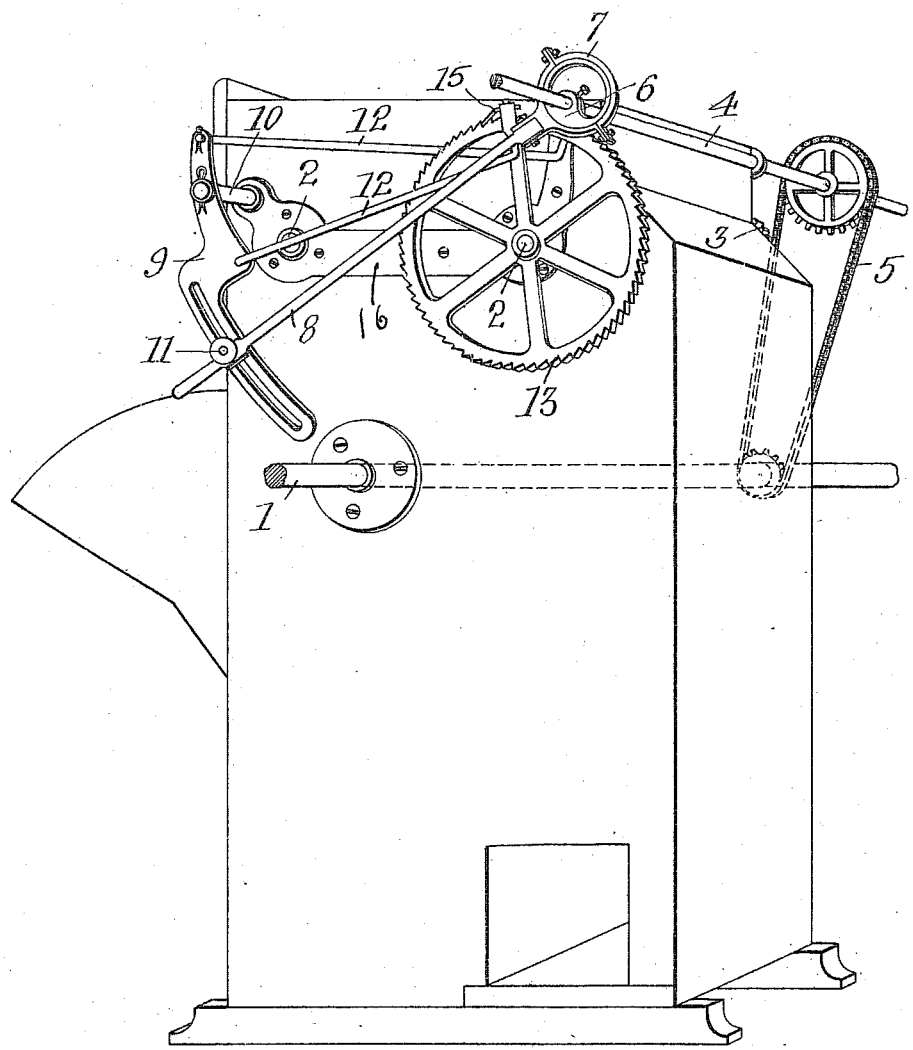

F. PHELPS.
DRIVING MECHANISM FOR COTTON GIN FEEDERS.
APPLICATION FILED JULY 3, 1909.

985,931.

Patented Mar. 7, 1911.

2 SHEETS—SHEET 1.

F. PHELPS.
DRIVING MECHANISM FOR COTTON GIN FEEDERS.
APPLICATION FILED JULY 3, 1909.
985,931.
Patented Mar. 7, 1911.
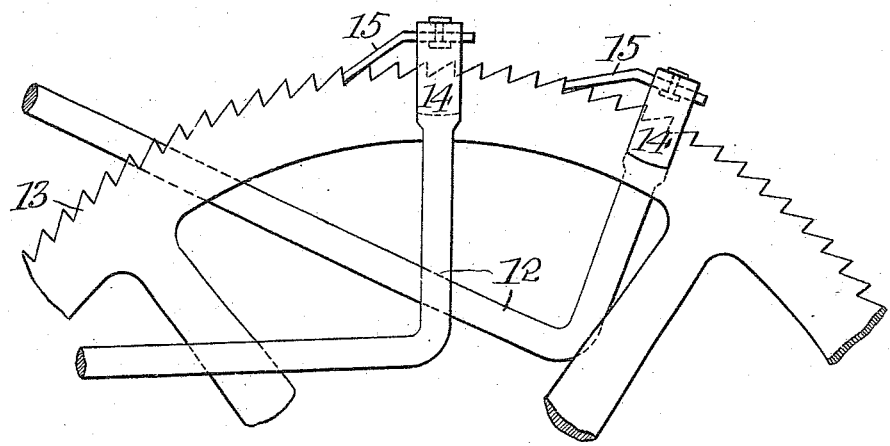
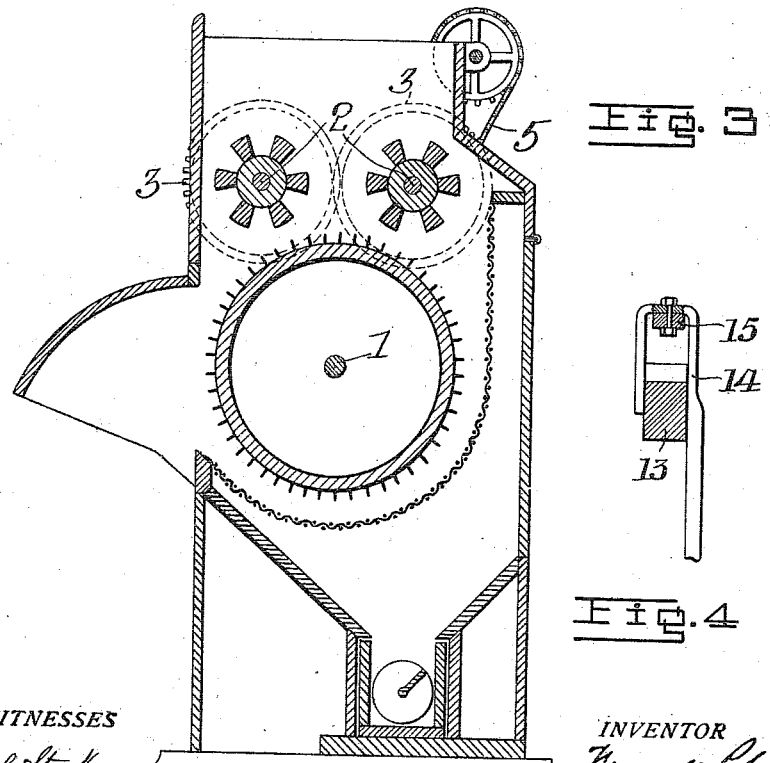
WITNESSES
INVENTOR

UNITED STATES PATENT OFFICE.

FRANK PHELPS, OF LITTLE ROCK, ARKANSAS.

DRIVING MECHANISM FOR COTTON-GIN FEEDERS.

985,931.               Specification of Letters Patent.        Patented Mar. 7, 1911.

Application filed July 3, 1909. Serial No. 505,911.

*To all whom it may concern:*

Be it known that I, FRANK PHELPS, a citizen of the United States, residing at Little Rock, in the county of Pulaski and State of Arkansas, have invented certain new and useful Improvements in Driving Mechanism for Cotton-Gin Feeders; and I do hereby declare the following to be a full, clear, and exact description of the invention, such as will enable others skilled in the art to which it appertains to make and use the same.

The object of my invention is to provide an efficient and practicable driving mechanism for cotton gin feeders and other purposes for which the same may be applicable.

The invention will be described with reference to the accompanying drawings, and then more particularly pointed out in the appended claim.

In said drawings: Figure 1 is a perspective view of a cotton gin feeder embodying my invention. Fig. 2 is a detail side view of a fragment of the ratchet wheel and the pawls that drive it. Fig. 3 is a vertical section of the gin feeder. Fig. 4 is a transverse section through the rim of the ratchet wheel and one of the pawls.

1 is the picker drum shaft to which power is applied by belting from a main line shaft. 2, 2 are the feed roller shafts which at one end are provided with intermeshing gears 3 (Fig. 3) whereby the fluted feed rollers revolve oppositely in the direction for feeding the cotton.

4 is a drive shaft to which power is communicated from shaft 1 by sprocket wheels and chain 5 or other suitable means. 6 is an eccentric-wheel fastened in a suitable manner to the shaft 4, and provided with the usual eccentric-strap 7, to which an eccentric-rod 8 is secured.

9 is a rocking lever fulcrumed intermediate its ends upon a stud 10 secured to the side of the gin-feeder. One end of the lever 9 is provided with a slot which receives a set-screw 11 that engages the free end of the eccentric-rod 8 and by means of which the point of connection of the eccentric-rod with the lever 9 can be moved nearer to or farther from the fulcrum of the lever.

12, 12 are pawls pivotally connected to the lever 9 at opposite sides of its fulcrum, and adapted to actuate a ratchet wheel 13 fast to one feed roller shaft 2, said pawls being arranged on opposite sides of the ratchet wheel. Each pawl is formed with an end disposed somewhat radially of the ratchet wheel, and each of such ends terminates in a clip or loop 14 that extends over the edge of the ratchet teeth and loosely embraces the ratchet wheel. Within each loop 14 and suitably secured to it, preferably to its horizontal portion, is a finger 15 that engages the teeth of the ratchet wheel and turns it.

16 is a plate which may be secured to the side of the gin feeder to provide bearings for the feed rollers and eccentric shafts, and to provide also a support for the stud that forms the fulcrum of the lever 9.

The operation, generally stated, is as follows: As the picker drum rotates, its shaft transmits motion to the drive shaft 4 through the medium of the chain and sprocket gearing; and as the shaft 4 rotates, the eccentric carried thereby rocks the lever 9 through the medium of the eccentric rod 8. As the pawls are pivoted to the lever 9 at opposite sides of its fulcrum, it will be seen that as one pawl is pulled toward the lever, rotating the ratchet wheel, the other pawl is pushed backward idling over the ratchet teeth into position to engage a tooth and rotate the wheel upon the reverse movement of the lever 9. The feed rollers are thus continuously rotated during the actuation of the picker drum.

As the ratchet wheel controls the rotation of the feed rollers, the rate at which cotton is fed to the picker drum can be varied by changing the stroke of the pawls. This can be accomplished by shifting the point of connection of the eccentric rod 8 with reference to the fulcrum of the lever 9. The angular ends of the pawls dispose their shanks below the ratchet teeth, thereby insuring positive engagement of the fingers 5 of the pawls with the ratchet teeth when the pawls are pulled in the direction to rotate the ratchet wheel. This construction renders unnecessary springs or other devices for holding the pawls in contact with the ratchet teeth.

As the looped ends 14 of the pawls embrace the ratchet wheel, the pawls are thereby secured against lateral disengagement from the ratchet teeth.

In practice, the gin feeders are frequently arranged in batteries comprising two or more feeders. When this arrangement obtains, the drive shaft 4 is continued throughout the entire battery and receives its power to drive all of the feeders through the one power transmitting means, as the sprocket and chain gearing illustrated. This is advantageous as it dispenses with the repetition of a power-transmitting means at each gin-feeder, and obviates the care required to properly adjust and maintain in working order such means.

An advantage of the invention is its simplicity, it having comparatively few moving parts.

Having described my invention, what I claim is:

In a machine of the character described, the combination with a ratchet wheel for operating the feed rollers of the machine, of a rocking-lever, means for actuating the rocking-lever, pawls adapted to actuate the ratchet wheel and pivoted to the rocking-lever at opposite sides of its fulcrum to alternately pull the ratchet wheel around, a pawl being disposed at each side of the ratchet wheel and the ends of the pawls being formed to loosely embrace the ratchet wheel to prevent lateral disengagement therefrom.

In testimony whereof I affix my signature, in presence of two witnesses.

FRANK PHELPS.

Witnesses:
H. A. BABBITT,
T. D. JOHNSON.

---

Copies of this patent may be obtained for five cents each, by addressing the " Commissioner of Patents, Washington, D. C."